United States Patent
Jabara et al.

(10) Patent No.: US 10,057,743 B2
(45) Date of Patent: Aug. 21, 2018

(54) SYSTEM AND METHOD FOR INTELLIGENT SMALL CELL OPERATION

(71) Applicant: Mobilitie, LLC, Newport Beach, CA (US)

(72) Inventors: Gary B. Jabara, Irvine, CA (US); Shah J. Zeb, Irvine, CA (US); Lloyd Frederick Linder, Agoura Hills, CA (US)

(73) Assignee: Mobilitie, LLC, Newport Beach, CA (US)

( * ) Notice: Subject to any disclaimer, the term of this patent is extended or adjusted under 35 U.S.C. 154(b) by 104 days.

(21) Appl. No.: 15/239,670

(22) Filed: Aug. 17, 2016

(65) Prior Publication Data

US 2018/0054817 A1 Feb. 22, 2018

(51) Int. Cl.
*H04W 4/80* (2018.01)
*H04W 76/27* (2018.01)
*H04W 88/08* (2009.01)

(52) U.S. Cl.
CPC ............. *H04W 4/80* (2018.02); *H04W 76/27* (2018.02); *H04W 88/085* (2013.01)

(58) Field of Classification Search
CPC ............. H04W 72/0446; H04W 4/008; H04W 76/046
USPC ......................... 370/310, 328, 329
See application file for complete search history.

(56) References Cited

U.S. PATENT DOCUMENTS

| | | | | |
|---|---|---|---|---|
| 2010/0151877 A1* | 6/2010 | Lee | ...................... | H04W 72/048 455/453 |
| 2015/0146594 A1* | 5/2015 | Grayson | ........... | H04W 52/0206 370/311 |
| 2015/0245361 A1* | 8/2015 | Hughes | ............... | H04W 72/082 455/450 |
| 2016/0044584 A1* | 2/2016 | Jung | ..................... | H04B 7/0617 370/330 |
| 2016/0227571 A1* | 8/2016 | Baek | ..................... | H04W 16/14 |

* cited by examiner

*Primary Examiner* — Obaidul Huq
(74) *Attorney, Agent, or Firm* — Davis Wright Tremaine LLP; Michael J. Donohue

(57) ABSTRACT

A system is disclosed for the intelligent operation of a small cell. A cell is implemented with multiple cellular transceivers that may be remotely configurable. A local controller monitors the current actual traffic flow from carriers currently be supported by the transceivers and current potential traffic flow from presently unsupported carriers and generates performance data related thereto. The performance data is reported to a remote controller with data analysis capability to develop a profile. Based on profile information, both current and historic, the remote controller can send configuration command data to the local controller. The local controller uses the configuration command data to reconfigure the transceivers in one or more cells to accommodate changing traffic flow patterns.

37 Claims, 5 Drawing Sheets

SYSTEM AND METHOD FOR INTELLIGENT SMALL CELL OPERATION

BACKGROUND OF THE INVENTION

Field of the Invention

The present disclosure is directed generally to small cell operation and, and more specifically, to a system and method for intelligent small cell operation.

Description of the Related Art

Currently, small cell products exist from multiple manufacturers. This availability includes small cell products from the wireless carriers themselves, as well as third-party manufacturers who develop products to service multiple carriers. The small cell products that from the carriers typically support only the modulation scheme and frequency bands of that particular carrier. Third-party manufacturers, such as CommScope, have developed products such as the OneCell product family, that support multiple carriers' modulation schemes and frequency bands. The OneCell product line currently supports nearly all of the major carriers using the transceiver hardware contained in its small cell products. The OneCell system includes a baseband controller product to control the transceivers for all of the carriers supported in the small cells in a given venue. For the current OneCell system, the signature characteristic of OneCell's approach to a cloud-radio access network (C-RAN) is that it creates a single cell out of many access points, or radio points (which are in essence the small cells) to eliminate cell borders all together. This also eliminates interference and handovers. In this approach, however, all small cells are programmed for operation with the same carrier and the same frequency bands and modulation scheme. The baseband controller product coordinates the functions of multiple radio endpoints (small cells) in order to achieve this configuration. The limitation of this approach, however, is that the mobile traffic in the venue or geographic area is not optimized based on the mobile traffic at a particular small cell. In other words, there is no intelligence associated with this configuration. For example, if all of the small cells are configured for wireless Carrier1, and the majority of the mobile devices in the venue are wireless Carrier2, wireless Carrier3, and wireless Carrier4, the majority of the mobile devices in the venue would have no coverage. Thus, although the OneCell small cell supports multiple carriers, the OneCell system is only configured to support a single carrier at a time in a venue.

Another company, Spidercloud, has also developed a multi-carrier small cell solution. Spidercloud's system utilizes a dual band radio, which can provide simultaneous operation without interference. However, the radio is pre-configured and cannot be dynamically reconfigured to support other wireless carriers.

It would be desirable to add intelligence to the system to permit a small cell system to "morph" into the appropriate configuration and support multiple carriers. The present invention provides this and other advantages as will be apparent from the following detailed description and accompanying Figures.

BRIEF DESCRIPTION OF THE SEVERAL VIEWS OF THE DRAWING(S)

DETAILED DESCRIPTION OF THE INVENTION

Figure 1:
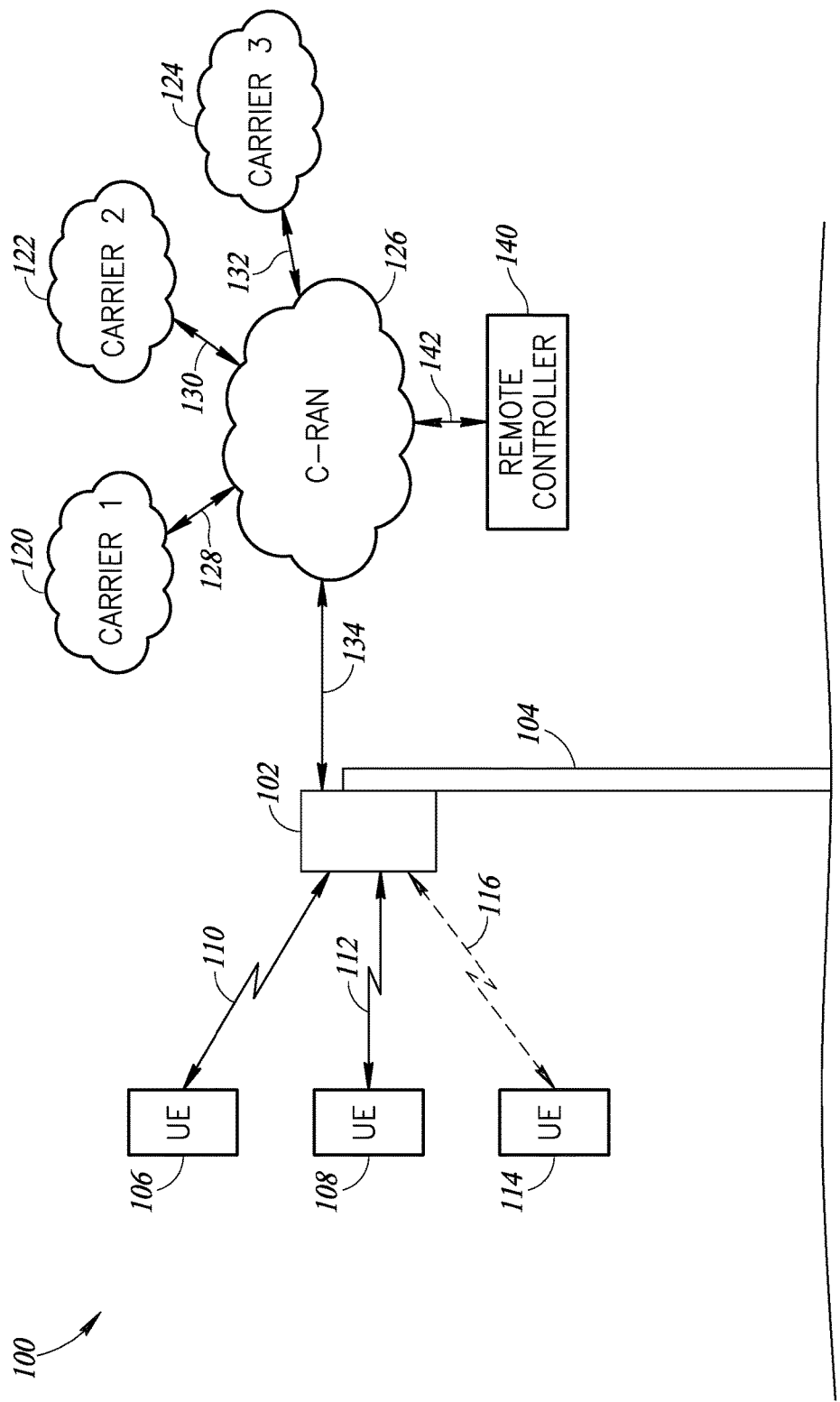
FIG. 1 is a diagram illustrating the operation of a single small cell configured for operation with multiple cellular providers.

As will be described in greater detail below, the present disclosure is directed to a system and method for intelligent small cell operation that permits the cell to dynamically change into the appropriate configuration and support multiple carriers, depending on one or more factors such as the current traffic load, the potential current traffic load if the cell is reconfigured for compatible operation with other carriers, the time of day in the venue, as well as in response to the mobile device traffic (or expected mobile device traffic) in the venue depending on the day of the week and the time of day. This intelligence also allows the system to minimize power dissipation, by only having selective radios on at any given time, based on the mobile device traffic at that time. In addition, the systems disclosed herein analyzes traffic flow from multiple wireless carriers to determine the most effective use of the radios in the cell. The radios are remotely programmable and can be dynamically altered to accommodate changes in traffic. In a typical embodiment, a cell is equipped with multiple remotely programmable radios. The cell can be configured to simultaneously provide coverage for a number of different wireless carriers up to the number available radios in the cell. For example, a cell having four remotely programmable radios can simultaneously accommodate four different wireless carriers. Because the radios are remotely programmable, they can be remotely reconfigured to accommodate changes in traffic. For example, if the four radios are initially configured to provide coverage for four different wireless carriers, and one wireless carrier has little or no traffic at the current time, that radio may be reconfigured to accommodate increased traffic flow from another of the wireless carriers. In yet another example, a cell may have one extra radio that is not generally used to provide services for any of the possible wireless carriers. Instead, the "spare" radio may be used to measure the current traffic load for wireless carriers that are not presently being serviced by the cell. For example, if four radios are available in a cell, three may be configured for operation with up to three different wireless carriers (e.g., Carrier1, Carrier2, and Carrier3). The fourth radio maybe periodically configured for operation with wireless carriers other than Carrier1-Carrier3. In this manner, it can be determined whether other wireless carriers have sufficient traffic flow to warrant reconfiguration of one of the three radios so as to maximize utilization of the radios for use with all wireless carriers. A top level block diagram concept for the overall system is shown in FIG. 1.

In a simplified form, a system 100 comprises a small cell 102 mounted on top of a pole 104. A User Equipment (UE) 106, which is typically implemented as a cellular phone, smart phone, mobile phone, etc., is coupled to the cell 102 via a radio communication link 110. Similarly, a UE 108 is coupled to the cell 102 via a radio communication link 112. As will be explained in greater detail below, the cell 102 includes multiple remotely configurable cellular transceivers. Each of the cellular transceivers in the cell 102 is configured to communicate with UEs of a particular cellular service provider or carrier. For example, the UE 106 is a subscriber to Carrier1 while the UE 108 is a subscriber to Carrier2.

Those skilled in the art will appreciate that various carriers utilize different wireless technologies. For example, Carrier1 may utilize LTE on 2100 megahertz (MHz) while Carrier2 may utilize CDMA communication protocol. Thus, the UE 106 communicates with one of the cellular transceivers in the cell 102 using the communication protocol of Carrier1. This includes the radio frequencies, power control scheme, modulation scheme, and all other parameters required for compatible communication with Carrier1. In contrast, the second cellular transceiver in the cell 102 is configured for compatible operation with Carrier2 such that the UE 108 communicates with the cell 102 using the radio frequencies, power control scheme, modulation scheme and all other parameters required for compatible operation with Carrier2. Because of the different operational frequencies and modulation schemes, the radio communication link 110 generally does not interfere with satisfactory operation of the radio communication link 112, and vice versa.

As will be described in greater detail below, FIG. 1 also illustrates a UE 114, which could be connected to the cell 102 via a radio communication link 116. In the example of FIG. 1, it is assumed that the cell 102 includes fewer cellular transceivers than cellular carriers. In the simplified example of FIG. 2, it is assumed that the cell 102 includes two cellular transceivers that are presently configured for Carrier1 and Carrier2, respectively. The UEs 106-108 are representative of one or more UEs that are subscribers to Carrier1 and Carrier2 and communicate with the cell 102. In contrast, the UE 114 is, in the present example, a subscriber to Carrier3. None of the transceivers in the cell 102 are currently configured for compatible operation with Carrier3. The radio communication link 116 is shown in a dashed line in FIG. 1 to illustrate that there is presently no radio communication link between the UE 114 and the cell 102.

As will be described in greater detail below, the cell 102 can monitor for activity of UEs that are subscribers to Carrier3. If the potential traffic load for subscribers of Carrier3 is large, and the relative load of subscribers for Carrier1 and/or Carrier2 are low (or nonexistent), the cellular transceiver(s) in the cell 102 may be reconfigured for compatible operation with Carrier3. This can be accomplished by turning on a radio for Carrier3, while other radios are configured for Carrier1 and Carrier2 (if an extra radio is available in the cell) or reconfiguring the radio for Carrier1 or Carrier2 if the traffic flowed for one of those carriers is low is nonexistent. Reconfiguration of the radios is handled by the smart cell functionality. In this event, the UE 114 can then communicate effectively with the cell 102 via the radio communication link 116.

The cell 102 effectively functions as a Radio Access Network (RAN) for multiple carriers and acts a neutral host. Those skilled in the art will appreciate that the small cell must exchange data with the respective carriers. FIG. 1 illustrates networks 120-124 for Carriers 1-3, respectively. Each of the carriers 120-124 communicate with a network 126 that functions as a Cloud Radio Access Network (C-RAN) via communication links 128-132, respectively. In turn, the C-RAN 126 is coupled to the cell 102 via a communication link 134. One skilled in the art will appreciate that the communication links 128-132 are combined with the C-RAN 126 and the communication link 134 to form backhauls between the cell 102 and the networks 120-124 of the respective carriers.

Those skilled in the art will also appreciate that the various communication links in the backhaul may be provided by a number of known technologies that may include wired and/or wireless communication links in various combinations. Wireless communication links may typically include microwave, or other radio frequency (RF) links. Wired links may include optical fibers, copper wire, coaxial cable, and the like. An IEEE standard, known as G.Fast, has the ability of increasing data rates using existing copper wires. The G.Fast technology may be capable of achieving speeds typically associated with optical fibers, but is currently unable to achieve such speed over long haul distances, as provided by optical fibers.

As noted above, the transceivers in the cell 102 are remotely programmable. The system 100 includes a remote controller 140 coupled to the C-RAN 126 via communication link 142. The remote controller 140 may be considered part of the "cloud," but is illustrated in FIG. 1 as a separate element to describe its functionality. The remote controller 140 can be configured to receive performance data from the cell 102 and to analyze the data to determine traffic patterns the remote controller 140 bases its decisions on data analytics. As will be discussed in greater detail below, the remote controller 140 can react dynamically to sudden changes in traffic patterns, but may also develop a historical profile that shows changes traffic flow at different times of day, different days of the week, during certain events, and the like. The remote controller 140 can use the dynamic data as well as historical data to send configuration command data to the transceivers in the cell 102 to reconfigure the operational parameters of the transceivers in the cell. This intelligent approach allows the system 100 to perfectly model dynamic traffic changes of different wireless carriers. Those skilled in the art will appreciate that the remote controller 140 may be implemented as a set of software instructions executing on an existing piece of hardware coupled to the C-RAN 126, as illustrated in FIG. 1. The remote controller 140 need not be an additional piece of hardware specifically implemented to make the system 100 work.

Figure 2:
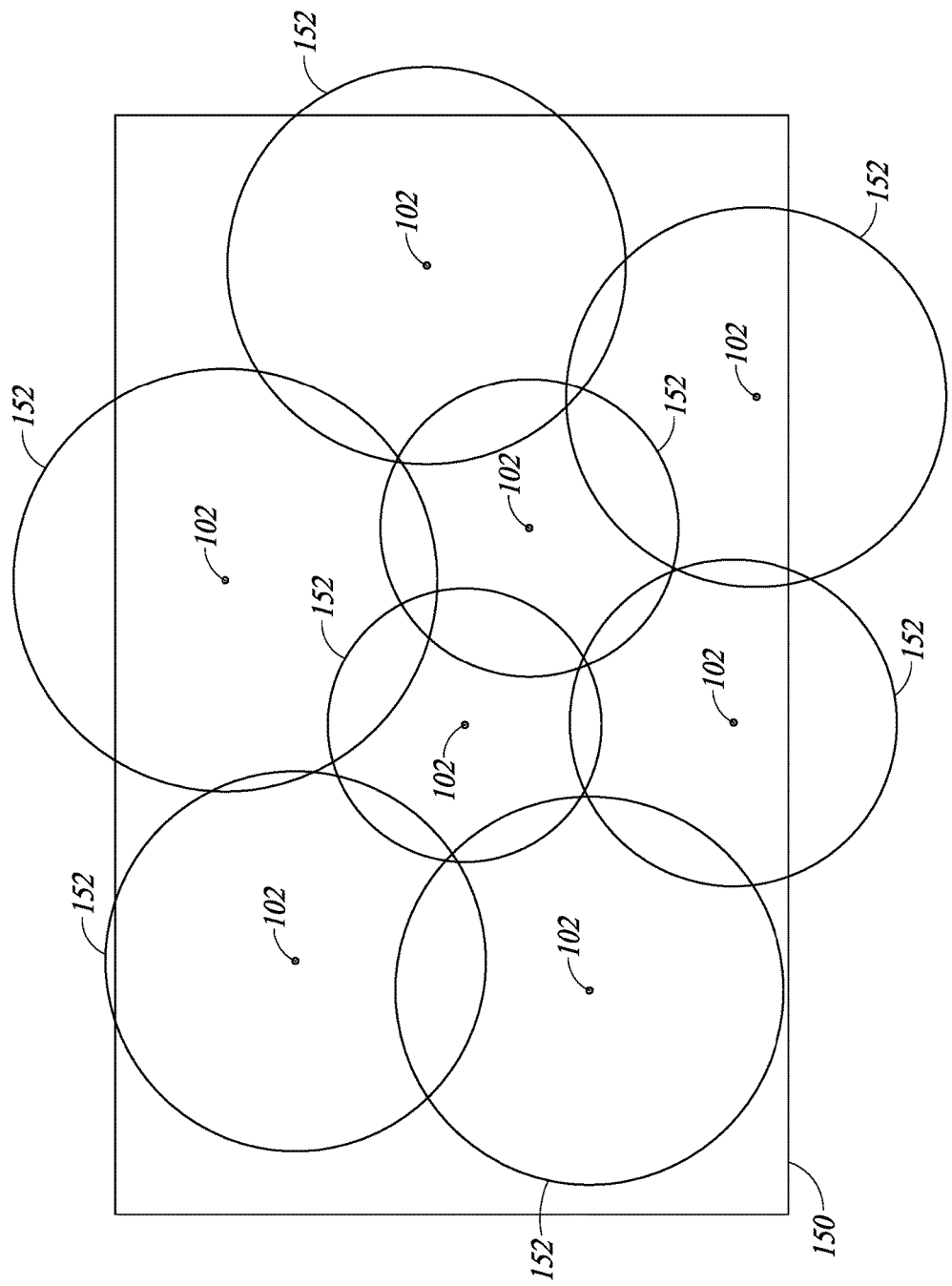
FIG. 2 illustrates sample areas of coverage in small cells in a venue.

FIG. 1 illustrates a single cell 102 to provide a simplified example of the multiple transceiver implementation of the system 100. FIG. 2 illustrates a more typical embodiment in which a plurality of cells 102 are installed in a venue 150, such as a shopping mall, convention center, sports complex, or the like. The cells 102 may also be configured for operation in an area such as a densely populated urban region, along a street, in a neighborhood or the like.

Each of the cells 102 has a generally circular area of coverage 152. Those skilled in the art will appreciate that FIG. 2 is a two dimensional representation of the areas of coverage 152. The area of coverage is actually a three dimensional volume centered roughly on the cell 102. As can be readily seen in FIG. 2, the size of the area of coverage 152 can be altered by controlling the transmission power of the cell 102. The shape of the area of coverage 152 can also be shaped by man-made structures, natural terrain, and the like. The user can also alter the shape of the area of coverage 152 through the use of directional antennas in a manner known in the art. The area of coverage 152 illustrated in FIG. 2 also takes into account the fact that this area is defined by multiple radios that are active simultaneously. The RF network design will count for interference mitigation techniques. Those techniques are known in the art and need not be described in greater detail herein.

Figure 3:
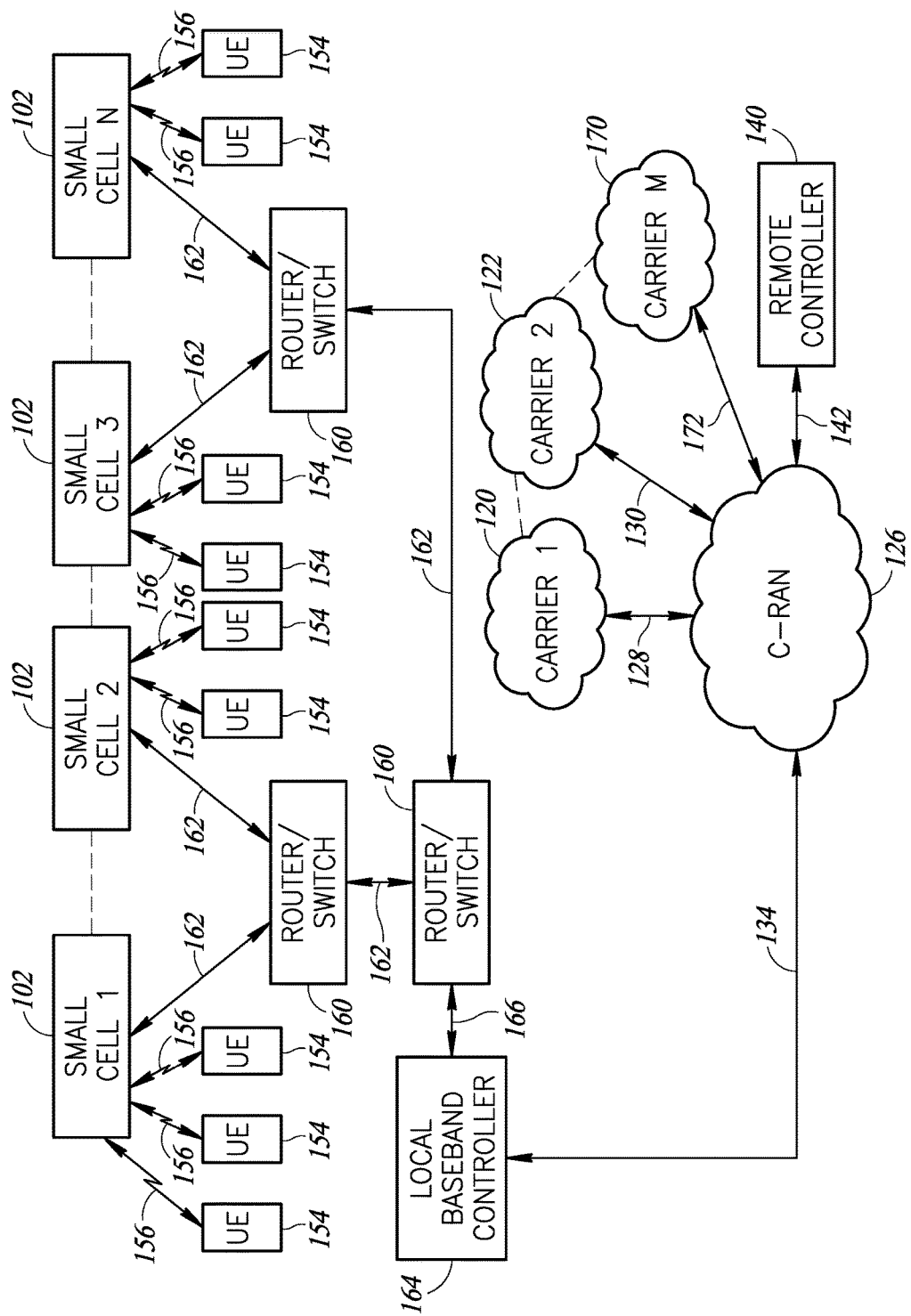
FIG. 3 illustrates a system architecture for multiple small cells.

FIG. 3 illustrates an example system architecture for use in a location such as the venue 150 (see FIG. 2). FIG. 3 illustrates cells 102 that are labelled as 1-N to illustrate the variable number of cells in a venue. The cells 102 may be distributed in a known manner to provide suitable coverage throughout the venue 150. FIG. 3 also illustrates a plurality of UEs 154 coupled to the various cells 102 via radio communication links 156. Although the UEs 154 and radio communication links 156 are generically labelled, those skilled in the art will appreciate that the UEs 154 may be subscribers of different carriers. Thus, the generically labelled radio communication links 156 may also be different due to the different configurations of the transceivers within each cell 102. Throughout the venue 150, the cells 102 are coupled to an infrastructure that includes one or more router/switches 160 that are interconnected via a plurality of communication links 162. The routers 160 and communication links 162 are conventional components whose operation is well understood and need not be explained in greater detail herein. The specific number and configuration of the routers 160 depend on the specific implementation in the venue 150.

The routers 160 are coupled to a local baseband controller 164 via a communication link 166. As discussed above, the communication links 162 and 166 may be implemented using known technologies, such as copper cables, coaxial cable or the like. The communication links 162 and 166 may also be implemented using the IEEE G.Fast protocol.

FIG. 3 illustrates a single local baseband controller 164 for the venue 150. Depending on the size and traffic volume in the venue 150, the system 100 may include more than one local baseband controller 164 that each operate independently with respect to each other. Alternatively, a single local baseband controller 164 may control the cells 102 in more than one venue. The single local baseband controller 164 in FIG. 3 is illustrative of a typical implementation, but should not be considered a limiting factor. If a single base band controller 164 is used, a base band controller supports all of the possible carrier frequencies in modulation schemes for all wireless carriers.

The local baseband controller 164 and cells 102 together form a wireless telecom station. Those skilled in the art will appreciate that each cell contains cellular transceivers, sometimes referred to as remote radio units (RRUs), which handle the RF processing for transmission and reception. This includes the modulation of baseband data for RF transmission as well as the demodulation of received RF signals into baseband data. The other component of the wireless telecom station is the local baseband controller 164, which processes baseband data for delivery from the cell 102 to the UE 154 on a downlink as well as processing the signals received by the cell 102 from the UE 154 on an uplink.

In addition to the conventional baseband controller operation, the local baseband controller 164 is used to configure the remotely configurable transceivers in each of the cells 102. Furthermore, the local baseband controller 164 collects operational data from the plurality of cells 102 to generate performance data related to the operation of each cell. This data can alternately be collected in the C-RAN 126 (see FIG. 1) and the base band controller 164 functions as a portal for the data to the cloud 126. The performance data is routed to the remote controller 140 via the C-RAN 126. Finally, the local baseband controller 164 also receives configuration command data from the remote controller 140 and provides commands to the cells 102 in response thereto.

The operation of the remote controller 140 and local baseband controller 164 add intelligence to the operation of the system 100. Adding this intelligence to the cell 102 provides greater flexibility in system architecture and improves operational performance. The cells 102 in FIG. 3 may be readily reconfigured to create a software defined network (SDN) whose operational configuration may be dynamically and remotely altered to accommodate traffic flow patterns. The reconfiguration capability of the cells 102 is accomplished through software in the C-RAN 126 (see FIG. 1), and effectively provides a network function virtualization (NFV) in which the remote controller 140 utilizes the C-RAN 126 to reconfigure the cells 102 to accommodate changing traffic patterns.

As noted above, data must be routed between each UE 154 and the respective carrier network to which the user subscribes. FIG. 3 illustrates the carrier networks 120-122 for Carrier1 and Carrier2, respectively. This principle may be extended to include a plurality of additional carriers up to a network 170 for CarrierM, which is coupled to the C-RAN 126 via communication link 172. As described above, the local baseband controller 164 operates in a conventional manner to route data to and from the respective carrier networks.

Figure 4:
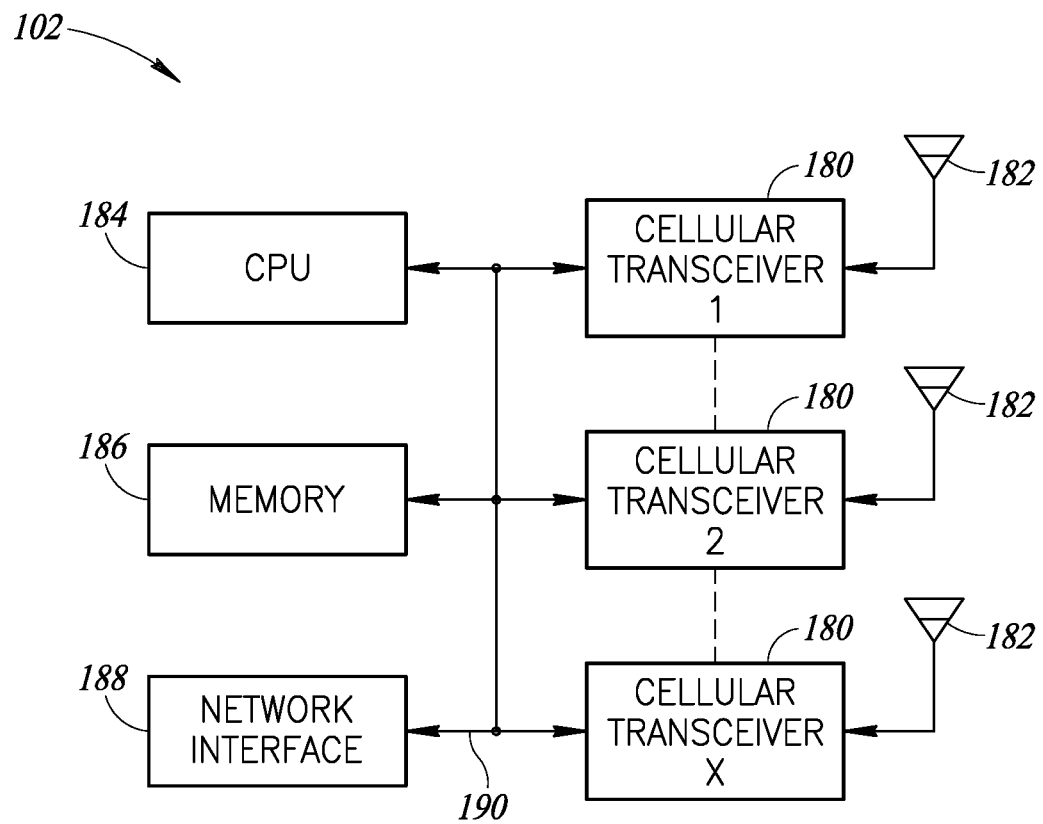
FIG. 4 is a functional block diagram of a system configured to implement the small cell architecture of FIG. 3.

FIG. 4 illustrates a functional block diagram of a cell 102. The cell 102 includes a plurality of cellular transceivers 180 labelled as transceivers 1-X. FIG. 3 illustrates system architecture for a number of carriers designated as Carrier1-CarrierM. In contrast the cell 102 has radios indicated as cellular transceivers 1-X. In general, the cell 102 has fewer radios than possible wireless carriers. That is, X<M to indicate that there is typically not a radio (e.g., the cellular transceivers 1-X) available for every wireless carrier within range of the cell 102. There may be other circumstances where a cell has a large number of radios such that X>M. Each cellular transceiver 180 is coupled to a corresponding RF antenna 182. As discussed above, each cellular transceiver 180 may be implemented as a software defined radio (SDR). As such, each cellular transceiver is remotely configurable using configuration command data transmitted by the remote controller 140 (see FIG. 3).

Control of the cell 102 is managed by a central processing unit (CPU) 184 operating in conjunction with a memory 186. Those skilled in the art will appreciate that the CPU 184 may be implemented as a conventional microprocessor, digital signal processor, programmable gate array, or the like. The system 100 is not limited by the specific form in which the CPU 184 is implemented. Similarly, the memory 186 may comprise various forms of memory, such as read-only memory, flash memory, random access memory, and the like. Some or all of the memory 186 may be integrated into the CPU 184. Again, the system 100 is not limited by the specific implementation of the memory 186. In general, the CPU 184 performs operations on data and instructions stored in the memory 186. The memory 186*b* will store the configuration data for the cell 102, and may be dynamically updated by the remote controller 140.

The cell 102 also includes a network interface 188. Those skilled in the art will appreciate that the form of the network interface 188 depends on the nature of the communication link 162 (see FIG. 3). For example, the network interface 188 may be an Ethernet interface, a G.Fast interface, cable modem, or the like. The network interface 188 couples the cell 102 to the router 160.

In operation, the cellular transceivers 180 may undergo an initial configuration such that the individual cellular transceivers are compatible with different carriers. In the example of FIG. 4, one cellular transceiver 180 can be configured for compatible operation with the network 120 of Carrier1 (see FIG. 3) while a second cellular transceiver may be configured for compatible operation with the network 122 for Carrier2. Other cellular transceivers can be similarly configured for compatible operation with the network 120 of Carrier1 or the network 122 for Carrier2 based on an initial expected traffic load, such that multiple transceivers can be configured for compatible operation with a single carrier. Other cellular transceivers 180 may also be configured for compatible operation with the networks of other carriers. The cell 102 may periodically activate one of the cellular transceivers for compatible operation with a different carrier (e.g., the network 124 for Carrier3) (see FIG. 1). Once activated, the cell 102 can determine the number of potential users of the network 124 for Carrier3. Following the measurement of a potential current traffic load for the network 124 for Carrier3, the cell 102 may reconfigure the extra cellular transceiver 180 for compatible operation with yet another network to thereby measure the potential load for that additional network. This process can be repeated for all known carrier networks so that the cell 102 can measure the actual current traffic load for existing configurations (e.g., the cellular transceivers 180 configured for compatible operation with Carrier1 and Carrier2) as well as the potential current traffic load for other carriers (e.g., Carrier3) not presently be served by the cell 102. That data, which may be referred to as performance data, is provided to the remote controller 140 (see FIG. 4) by the local baseband controller 164 via the C-RAN 126.

The remote controller 140 collects performance data for the multiple cells 102 in the venue 150 (see FIG. 2) and can effectively construct an operational profile for each cell. The operational profile can measure traffic load at the time of the measurement, but may also be accumulated over time to provide a historical profile of mobile traffic. For example, the remote controller 140 may comprise a data analytics module to learn and predict mobile traffic patterns and automatically configure each cell 102 based on the time of day, day of the week, as the result of certain activities (e.g., a convention or sporting event). This data will allow each cell 102 to be configured for the appropriate carrier at any given cell at any given time. Additionally, as more and more data is collected and analyzed over time, the system 100 can self-configure itself based on mobile traffic patterns for a given time. The collected data, and resulting data statistics and analytics, provide valuable information to the carriers. The accuracy of the self-configuration can also be checked and verified, or corrected if needed.

As the number of venues that utilize the system architecture of the system 100 increase, the amount of available data also increases. Those skilled in the art will appreciate that this may provide data mining opportunities not only for the carriers, but for businesses that are located in a single or multiple ones of the venues. The collected data and data statistics can provide valuable information with regard to the behavior of mobile device users with regard to shopping, eating, or spending time in one or more of the multiple venues. Depending on the rate at which performance data is gathered, the system 100 can also act to determine the location of a particular phone in a venue while that particular phone is present in the venue. This data can effectively provide a history of the mobile at a particular venue as it traverses throughout the venue.

In one embodiment, the remote controller 140 may poll the vocal baseband controller 164 to initiate the measurement cycle described above where actual current traffic loads for operating cellular transceivers 180 can be measured and where a cellular transceiver 180 is configured for operation with various carriers to thereby determine the potential traffic load for those carriers. In response to the poll from the remote controller, the local baseband controller 164 sends instructions to each cell 102 to cause at least one of the cellular transceivers 180 in the cell to be reconfigured for compatible operation with different carriers.

In one embodiment, the remote controller 140 may be in a loop that effectively continuously polls the local baseband controller 164. Alternatively, the remote controller 140 may periodically initiate a poll of the local baseband controller 164. In yet another embodiment, the remote controller 140 may poll the local baseband controller 164 at a variable rate that varies based on performance data previously received from the local baseband controller. For example, if a previous polling cycle(s) indicated an upsurge of actual traffic or potential traffic for one or more carriers, the remote controller 140 may increase the rate of polling to obtain more accurate measurements of changes in the actual or potential traffic load. Conversely, if previous polls indicate that there is little fluctuation in the actual traffic load or potential traffic load for other carriers, the remote controller 140 may decrease the variable polling rate to thereby conserve operational overhead in the system 100.

In yet another embodiment, the local baseband controller 164 may itself initiate the gathering of performance data and automatically transmit the performance data to the remote controller. In this embodiment, the local baseband controller 164 (see FIG. 3) may instruct each of the cells 102 to reconfigure one or more of the cellular transceivers 180 to measure potential mobile traffic for carriers that are not presently serviced by these cells. This performance data may be automatically reported back to the remote controller 140 or reported in response to a poll request from the remote controller.

In one embodiment the local baseband controller 164 may continuously measure performance data and transmit said performance data to the remote controller 140. Alternatively, the local baseband controller 164 may periodically initiate the measurement of performance data and report the periodic data to the remote controller 140. In yet another embodiment, the local baseband controller 164 may initiate the measurement of performance data at a variable rate depending on previous performance data. As described above with respect to the remote controller 140, the local baseband controller 164 may perform measurements at a certain rate and, if previous measurements indicate an upsurge in actual traffic or potential traffic, the local baseband controller may increase the rate at which performance data is measured and reported to the remote controller 140. Conversely, if previous measurements of performance data indicate little or no change in the actual mobile traffic or potential mobile traffic, the local baseband controller 164 initiate performance measurements at lower rate to reflect the fact that the data load is changing slowly (or not at all). In an exemplary embodiment, the decisions on reconfiguration of the cellular transceivers 180 (see FIG. 4) are made in the C-RAN 126 and the remote controller 140, which performs the data analytics. These decisions are made by the analytical software in the remote controller 140.

In yet another embodiment, the local baseband controller 164 can detect periods of time where there is no traffic flow, such as when the shopping mall, convention center, or sports venue are closed. In such a situation, the local baseband controller 164 may turn off the transceivers 180 in the cells 102 to conserve power. The power-down procedure may also be reported to the remote controller 140 to form part of the historic profile for the individual cells 102 and/or the venue 150 (see FIG. 2). The historic profile generated by the remote controller 140 may cause all transceivers 180 in the cells 102 to remain in a power-down mode for a predetermined period of time (e.g., 9:00 p.m. to 9:00 a.m. the following day). In another alternative embodiment, the local baseband controller 164 may periodically power up one of the cellular transceivers 180 in one or more of the cells 102 in the venue 150 to check for any mobile traffic. If there is a sufficient volume of mobile traffic, the local baseband controller 164 can power up one or more transceivers in the cells 102 and configure them for compatible operation with the various carriers, as described above. In yet another embodiment, the system 100 can provide a manual override to allow a user to manually power up or power down the transceivers 180 in the cells 102.

Figure 5:
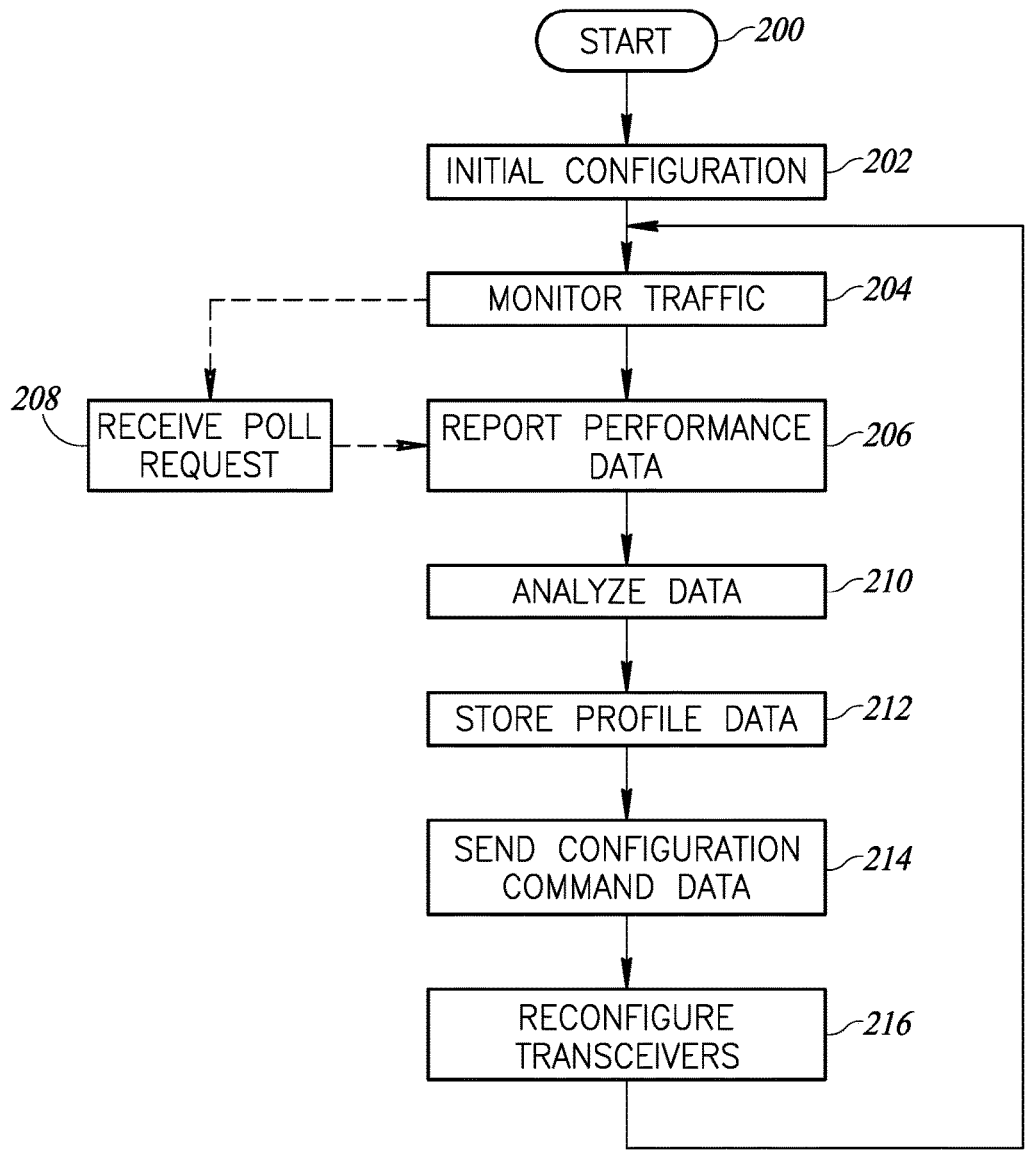
FIG. 5 is a flow chart illustrating an example implementation of intelligent small cell operation.

FIG. 5 is a flowchart illustrating operation of the system in the example of FIG. 3. At a start 200, the system 100 is deployed in the venue 150. In step 202, the system undergoes an initial configuration. This may comprise configuring the transceivers 180 (see FIG. 4) in the cells 102 for operation with selected carriers based on expected traffic loads, or even based on contractual obligations with selected carriers to provide service for those carriers. In step 204, the local baseband controller 164 (see FIG. 3) monitors the current traffic and potential current traffic. As previously described, the potential current traffic indicates the amount of mobile device traffic that could be supported by a particular cell 102 if one or more of the transceivers 180 were reconfigured for compatible operation with carriers that are not currently supported. That is, the potential current traffic that would result if a transceiver 180 currently configured for compatible operation with the network 122 of Carrier2 were reconfigured for compatible operation with the network 124 of Carrier3.

Those skilled in the art will appreciate that the threshold at which the transceiver 180 is reconfigured for compatible operation with a different wireless carrier may vary from one venue to another. When there is no traffic for a particular wireless carrier at some point in time, it is an easy decision to reconfigure the transceiver 180 for compatible operation with a different wireless carrier. However, when the transceiver 180 is carrying some traffic and there is a potential for carrying a greater traffic load of a different wireless carrier, there are decisions to be made regarding the thresholds for transceiver reconfiguration. There is a threshold for the current carrier (i.e., a minimum traffic level for one of the transceivers 180 currently configured for compatible operation with a wireless carrier) as well as a threshold for a carrier not currently being serviced by the cell 102 (i.e., a minimum traffic level for one of the transceivers 180 if reconfigured for compatible operation with a wireless carrier not currently being serviced). The thresholds can be expressed in a variety of convenient manners, such as absolute numbers (i.e., the current actual traffic load and the current potential traffic load) or as a percentage (e.g., reconfiguring one of the transceivers 180 for compatible operation with a wireless carrier not currently being serviced will result in a 10% increase of traffic flow in the cell 102). If traffic on one of the transceivers 180 falls below a predetermined threshold, the remote controller 140 may use the profile data generated by the data analytics module to select a different wireless carrier to support. Alternatively, the remote controller may trigger a poll of the cell to dynamically identify a replacement wireless carrier.

The transceivers 180 have a known maximum bandwidth. The owner/operator of the system 100 can set an optimum bandwidth utilization for operation of each of the transceivers 180 (e.g., 85%) and reconfigure the transceivers 180 based on the optimum bandwidth utilization or a deviation from the optimum bandwidth utilization. For example, if the owner/operator of the system 100 wishes to maintain a traffic level of 85% of the maximum capacity of the transceivers 180, the remote controller 140 (see FIG. 3) may reconfigure one of the transceivers if the traffic on that transceiver falls below 85% of the maximum capacity. In this embodiment, the remote controller 140 and its data analytics module can use the profile to determine traffic flow patterns, as described above, but will try to operate within the threshold parameters that may be set by the owner/operator of the system 100. If the profile predicts that traffic on one of the transceivers 180 is expected to fall below the specified threshold, the remote controller 140 can select a different wireless carrier based on the historic profile or command the local controller 164 to perform a poll of the cell 102 to dynamically select a replacement wireless carrier.

In one embodiment, the data analytics module in the remote controller 140 (see FIG. 3) can automatically determine thresholds based on, by way of example, the historical profile. Alternatively, the data analytics module in the remote controller 140 can also consider factors such as contractual obligations with one or more wireless service providers. For example, Carrier1 may contract with the owner/operator of the system 100 to provide wireless services up to 70%, for example, of the maximum bandwidth of one of the transceivers 180 in a particular cell 102, a group of cells, an entire venue or a geographic region. The remote controller 180 may limit traffic for Carrier1 to the contractual limit of the transceiver capacity even in the face of greater demand from subscribers of Carrier1. In this same example, if the traffic for Carrier1 drops to zero, the remote controller 140 may reconfigure one of the transceivers 180 for compatible operation with a different carrier, but poll more frequently to permit early detection of traffic for Carrier1 and the reconfiguration of one of the transceivers 180 for compatible operation with Carrier1. This reconfiguration may be on a cell-by-cell basis, for a group of cells, all the cells in a venue or all the cells in a geographic region. The system 100 is not limited to the remote monitoring and reconfiguration of transceivers 180 in a single cell 102. Note that the transceiver 180 reconfigured for compatible operation with Carrier1 need not be the same transceiver 180 that was originally configured for compatible operation with Carrier1. The remote configuration capability of the transceivers 180 permits greater flexibility for the remote controller to intelligently adjust to ongoing changes in traffic flow patterns.

In yet another alternative, an owner/operator of the system 100 can manually set thresholds or set ranges of thresholds for inclusion in the analysis by the data analytics module. For example, the owner/operator of the system 100 may designate one or more of the transceivers 180 for compatible operation with a wireless carrier (e.g., Carrier3) based on contractual obligations with the carrier. The remote controller 104 can still use the system 100 to dynamically monitor and control (i.e., reconfigure) the other transceivers 180 in the cell 102, group of cells in a venue, all the cells in a venue or cells in a geographic region.

In step 206, the local baseband controller 164 reports the performance data to the remote controller 140 via the C-RAN 126. As discussed above, there are a number of alternative embodiments for triggering the monitor process. For example, in step 208, the local baseband controller 164 receives a poll request from the remote controller 140. The local baseband controller 164 reports the performance data in step 206 in response to the received poll request. Those skilled in the art will also appreciate that the poll request may trigger the collection of performance data. Thus, the process of monitoring traffic in step 204 and reporting the performance data in step 206 may both be the result of receiving a poll request in step 208.

In step 210, the remote controller 140 analyzes the received performance data. For the sake of simplicity in describing the system 100, the description has focused on a limited set of performance data. However, those skilled in the art will appreciate that the remote controller 140, with data analytics module capability, may analyze performance data from all the cells 102 in a single venue, such as the venue 150. Indeed, the remote controller 140 can analyze performance data from a plurality of different venues that can include a large number of cells.

In step 212, the remote controller stores the profile data for each of the cells. That profile data is used to generate configuration command data that can be used to reconfigure the transceivers 180.

In step 214, the remote controller 140 sends the configuration command data to the local baseband controller 164 via the C-RAN 126. In response to the received configuration command data, the local baseband controller 164, in step 216, may reconfigure one or more of the transceivers 180 in one or more of the cells 102 in the venue 150. As discussed above, reconfiguration of the transceivers 180 may cause a cell to stop supporting one carrier (if there is no traffic for that carrier) and be reconfigured for compatible operation with a different carrier to support the present global traffic load for the different carrier. Thus, the system 100 allows the dynamic reconfiguration of the cells 102 to accommodate changing traffic flow patterns.

Following reconfiguration of the transceivers in step 216, the system 100 can return to step 204 to continue monitoring traffic. Under normal circumstances, this is a continuous operation such that the activity in each of the cells is carefully monitored and the transceivers in one or more cells 102 can be reconfigured to accommodate changing traffic flow patterns.

The flowchart of FIG. 5 provides an example of operation in a simplified system. However, one can appreciate that the remote controller 140 (see FIG. 3) and its data analytics module will typically monitor a number of cells 102 in a venue or geographic region. With the collection of performance data from a large number of cells 102, the data analytics module will develop a model or profile of a venue or geographic region to learn and predict traffic flow patterns for various wireless carriers.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system for communication with a plurality of mobile communication devices, the system comprising:

a plurality of remotely configurable short-range cellular transceivers to form a small cell and to communicate with the plurality of mobile communication devices within the small cell wherein a first of the plurality of short-range cellular transceivers is configured for compatible operation with a first of a plurality of different cell service operators for mobile communication devices compatible with the first cell service operator and a second of the plurality of short-range cellular transceivers is configured for compatible operation with a second of the plurality of different cell service operators for mobile communication devices compatible with the second cell service operator;

a local controller configured to monitor operation of the plurality of transceivers and to generate performance data related thereto;

a remote controller in communication with the local controller and receiving the performance data therefrom, the remote controller being further configured to send configuration command data to the first of the plurality of transceivers to reconfigure operational parameters of the first of the plurality of transceivers and thereby alter the operation of the first of the plurality of transceivers for compatible operation with one of the plurality of cell service operators other than the first cell service operator; and a communication link to couple the local controller to the remote controller.

2. The system of claim 1 wherein the plurality of transceivers are software-defined radios (SDRs) that are configurable to operate with any of the plurality of different cell service operators, the configuration command data causing at least one of the plurality of transceivers to reconfigure from compatible operation with the first cell service operator to compatible operation with the second cell service operator, the first and second cell service operators being incompatible with each other.

3. The system of claim 1 wherein the remote controller is further configured to poll the local controller, the local controller being further configured to transmit the performance data to the remote controller in response to the poll.

4. The system of claim 3 wherein the remote controller continuously polls the local controller.

5. The system of claim 3 wherein the remote controller periodically polls the local controller.

6. The system of claim 3 wherein the remote controller polls the local controller at a variable rate that varies in dependence of the performance data received from the local controller.

7. The system of claim 1 wherein the local controller initiates transmission of the performance data to the remote controller.

8. The system of claim 7 wherein the local controller continuously initiates transmission of the performance data to the remote controller.

9. The system of claim 7 wherein the local controller periodically initiates transmission of the performance data to the remote controller.

10. The system of claim 7 wherein the local controller initiates transmission of the performance data to the remote controller at a variable rate that varies in dependence of the performance data generated by the local controller.

11. The system of claim 1 wherein the local controller generates performance data based on an actual traffic load of each of the plurality of transceivers configured for compatible operation with respective ones of the plurality of different cell service operators and a potential traffic load of each of the plurality of transceivers if configured for compatible operation with others of the plurality of different cell service operators for which the plurality of transceivers are not currently configured for compatible operation.

12. The system of claim 1 wherein the remote controller is further configured to analyze the received performance data and to generate the configuration command data based on the analyzed performance data.

13. The system of claim 1 wherein the remote controller is further configured to generate the configuration command data based on the received performance data most recently received from the local controller.

14. The system of claim 1 wherein the remote controller is further configured to accumulate a plurality of instances of the received performance data and the generate a historical profile based thereon, the configuration command data being generated by the remote controller based at least in part on the historical profile.

15. The system of claim 1 wherein each of the plurality of cellular transceivers has a known maximum bandwidth and a user-selectable optimum bandwidth utilization, the remote controller being further configured to generate the configuration command data based on the user-selectable optimum bandwidth utilization.

16. The system of claim 1 wherein the local controller is further configured to send a power-down command to at least one of the plurality of cellular transceivers to cause the at least one cellular transceiver to enter a power-down mode and thereby cease transmitting and receiving data from any mobile communication devices.

17. The system of claim 16 wherein the local controller is further configured to periodically send a power-up command to the at least one cellular transceiver to cause the at least one cellular transceiver to enter a power-up mode and thereby be operational to transmit and receive data from mobile communication devices.

18. The system of claim 16 wherein the local controller is further configured to send a power-up command to the at least one cellular transceiver at a predetermined time of day to cause the at least one cellular transceiver to enter a power-up mode and thereby be operational to transmit and receive data from mobile communication devices.

19. The system of claim 1 wherein the local controller is further configured to send a power-down command to at least one of the plurality of cellular transceivers to cause the at least one cellular transceiver to enter a power-down mode and thereby cease transmitting when the local controller determines that the at least one cellular transceiver is not communicating with any mobile communication devices.

20. A system for the control of remotely configurable short-range cellular transceivers via a computer network, comprising:
  a data analytics module coupled to the network and configured to receive performance data related to the operation of the plurality of transceivers and to analyze the performance data, including performance data based on an actual traffic load of each of the plurality of transceivers configured for compatible operation with respective ones of a plurality of different cell service operators and a potential traffic load of each of the plurality of transceivers if configured for compatible operation with others of the plurality of different cell service operators for which the plurality of transceivers are not currently configured for compatible operation, the data analytics module being further configured to generate configuration command data to reconfigure operational parameters of the plurality of transceivers and thereby alter the operation of the plurality of transceivers;
  a remote controller coupled to the network and configured to send the configuration command data to at least a portion of the plurality of transceivers to reconfigure operational parameters of the portion of transceivers and thereby alter the operation of the portion of transceivers for compatible operation with respective ones of a plurality of different cell service operators; and
  a communication link to couple the short-range transceivers to the remote controller.

21. The system of claim 20 wherein the plurality of transceivers are software-defined radios (SDRs) that are configurable to operate with any of the plurality of different cell service operators, the configuration command data causing at least one of the plurality of transceivers to reconfigure from compatible operation with a first of the plurality of cell service operators to compatible operation with a second of the plurality of cell service operators.

22. The system of claim 20 wherein the remote controller is further configured to poll a local controller, the local controller being further configured to transmit the performance data to the data analytics module in response to the poll.

23. The system of claim 20 wherein the data analytics modules is further configured to receive performance data over a period of time and to generate a historical profile based thereon, the configuration command data being generated by the remote controller based at least in part on the historical profile.

24. A method for communication with a plurality of mobile communication devices, the method comprising:
a plurality of remotely configurable short-range cellular transceivers to form a small cell and to communicate with the plurality of mobile communication devices within the small cell wherein a first of the plurality of short-range cellular transceivers is configured for compatible operation with a first of a plurality of different cell service operators for mobile communication devices compatible with the first cell service operator and a second of the plurality of short-range cellular transceivers is configured for compatible operation with a second of the plurality of different cell service operators for mobile communication devices compatible with the second cell service operator;
a local controller monitoring operation of a plurality remotely configurable short-range cellular transceivers;
generating performance data related thereto;
a remote controller receiving the performance data from the local controller;
analyzing the performance data; and
based at least in part of the analysis of the performance data, sending configuration command data to the first of the plurality of transceivers to reconfigure operational parameters of the first of the plurality of transceivers and thereby alter the operation of the first of the plurality of transceivers for compatible operation with one of the plurality of different cell service operators other than the first cell service operator.

25. The method of claim 24 wherein the plurality of transceivers are software-defined radios (SDRs) that are configurable to operate with any of the plurality of different cell service operators, the configuration command data causing at least one of the plurality of transceivers to reconfigure from compatible operation with a first of the plurality of cell service operators to compatible operation with a second of the plurality of cell service operators.

26. The method of claim 24, further comprising the remote controller polling the local controller, the local controller monitoring operation and generating performance data in response to the poll.

27. The method of claim 26 wherein the remote controller polling the local controller comprises periodically polling the local controller.

28. The method of claim 26 wherein the remote controller polling the local controller comprises the remote controller polling the local controller at a variable rate that varies in dependence of the performance data received from the local controller.

29. The method of claim 24, further comprising the local controller initiating transmission of the performance data to the remote controller.

30. The method of claim 24 wherein generating performance data comprises generating performance data based on an actual traffic load of each of the plurality of transceivers configured for compatible operation with respective ones of the plurality of different cell service operators and a potential traffic load of each of the plurality of transceivers if configured for compatible operation with others of the plurality of different cell service operators for which the plurality of transceivers are not currently configured for compatible operation.

31. The method of claim 24, further comprising generating the configuration command data based on the received performance data most recently received from the local controller.

32. The method of claim 24, further comprising the remote controller accumulating a plurality of instances of the received performance data to thereby generate a historical profile based and generating the configuration command data based at least in part on the historical profile.

33. The method of claim 24 wherein each of the plurality of cellular transceivers has a known maximum bandwidth and a user-selectable optimum bandwidth utilization, the remote controller being further configured to generate the configuration command data based on the user-selectable optimum bandwidth utilization.

34. A method for the control of remotely configurable short-range cellular transceivers via a computer network, comprising:
a data analytics module coupled to the network and receiving performance data related to the operation of the plurality of transceivers;
analyzing the performance data, including performance data based on an actual traffic load of each of the plurality of transceivers configured for compatible operation with respective ones of a plurality of different cell service operators and a potential traffic load of each of the plurality of transceivers if configured for compatible operation with others of the plurality of different cell service operators for which the plurality of transceivers are not currently configured for compatible operation;
generating configuration command data to reconfigure operational parameters of at least a portion of the plurality of transceivers and thereby alter the operation of the portion of the plurality of transceivers; and
sending the configuration command data to the portion of the plurality of transceivers to cause the reconfiguration of operational parameters of the portion of transceivers and thereby alter the operation of the portion of transceivers for compatible operation with respective ones of a plurality of different cell service operators.

35. The method of claim 34 wherein the plurality of transceivers are software-defined radios (SDRs) that are configurable to operate with any of the plurality of different cell service operators, the configuration command data causing at least one of the plurality of transceivers to reconfigure from compatible operation with a first of the plurality of cell service operators to compatible operation with a second of the plurality of cell service operators.

36. The method of claim 34, further comprising polling a local controller, the local controller monitoring operation and generating the performance data in response to the poll.

37. The system of claim 34, further comprising the data analytics modules receiving performance data over a period of time and to generating a historical profile based thereon, the configuration command data being generated based at least in part on the historical profile.

* * * * *